[12] United States Patent
Klose

(10) Patent No.: US 11,120,557 B1
(45) Date of Patent: Sep. 14, 2021

(54) SYSTEM AND METHOD FOR DETECTING OBJECTS IN IMAGES

(71) Applicant: Shelly Klose, Bronxville, NY (US)

(72) Inventor: Shelly Klose, Bronxville, NY (US)

( * ) Notice: Subject to any disclaimer, the term of this patent is extended or adjusted under 35 U.S.C. 154(b) by 0 days.

(21) Appl. No.: 17/173,157

(22) Filed: Feb. 10, 2021

Related U.S. Application Data

(60) Provisional application No. 63/086,821, filed on Oct. 2, 2020.

(51) Int. Cl.
G06T 7/11 (2017.01)
G06N 3/08 (2006.01)
G06N 3/04 (2006.01)
G06Q 40/08 (2012.01)

(52) U.S. Cl.
CPC .............. G06T 7/11 (2017.01); G06N 3/04 (2013.01); G06N 3/08 (2013.01); G06Q 40/08 (2013.01); G06T 2207/20081 (2013.01); G06T 2207/20084 (2013.01); G06T 2207/30184 (2013.01)

(58) Field of Classification Search
CPC .......... G06T 7/11; G06T 2207/30184; G06T 2207/20081; G06T 2207/20084; G06N 3/08; G06N 3/04; G06Q 40/08
See application file for complete search history.

(56) References Cited

U.S. PATENT DOCUMENTS

2004/0134107 A1* 7/2004 Hinterkeuser .......... G09F 19/22
40/584
2020/0348132 A1* 11/2020 Du ..................... G06K 9/00664

OTHER PUBLICATIONS

Perez-Yus et al., "Detection and Modelling of Staircases Using a Wearable Depth Sensor," Mar. 20, 2015, Computer Vision—ECCV 2014 Workshops, pp. 449-463. (Year: 2015).*

* cited by examiner

Primary Examiner — John W Lee
(74) Attorney, Agent, or Firm — Lombard & Gelibeter LLP; Antonio Papageorgiou

(57) ABSTRACT

In at least one aspect, a computer system is provided that includes at least one computer having software stored thereon that when executed causes the at least one computer to perform a method that includes the step or steps of: receiving at least one image that depicts a structure on real property, the structure having a first floor and at least one structural element depicted in the at least one image; dividing the image into a plurality of regions; predicting at least one bounding box for the at least one structural element in the at least one image; predicting that the bounding box contains a structural element of interest; estimating a first floor elevation or height of the structure on the real property based on the structural element of interest; and storing the estimated first floor elevation or height in at least one database.

18 Claims, 8 Drawing Sheets

SYSTEM AND METHOD FOR DETECTING OBJECTS IN IMAGES

The present application claims the benefit of provisional patent application Ser. No. 63/086,821, filed on Oct. 2, 2020, which is hereby incorporated herein by reference.

FIELD OF THE INVENTION

This application generally relates to methods and systems for analyzing photographs and more specifically for identifying objects in digital images.

DESCRIPTION OF THE RELATED ART

Digital image processing has become commonplace. For example, systems are available for detecting facial features in photos and associating those features with individuals. There are also systems for determining the dimensions of objects in photos. These systems, however, have several drawbacks, including with respect to complexity and being prone to error. Human confirmation of objects in the photo may reduce errors, but this makes the process slower and certainly more expensive, particularly when potentially thousands of images are involved. Accordingly, there is a need for systems and corresponding methods for detecting objects in images and determining certain measurements or other quantifiable characteristics of such objects in the images that are not so limited.

SUMMARY OF THE INVENTION

In at least one aspect, a computer system is provided that includes at least one computer having software stored thereon that when executed causes the at least one computer to perform a method comprising: receiving at least one image that depicts a structure on real property, the structure having a first floor and at least one structural element depicted in the at least one image; dividing the image into a plurality of regions; predicting at least one bounding box for the at least one structural element in the at least one image; predicting that the bounding box contains a structural element of interest; estimating a first floor elevation or height of the structure on the real property based on the structural element of interest; and storing the estimated first floor elevation or height in at least one database.

In at least one embodiment, the at least one structural element includes a set of stairs and wherein the method includes the step of predicting a plurality of bounding boxes for each stair of the set of stairs, counting a number of stairs in the set of stairs, and estimating the first floor elevation or height based on the number of stairs in the set of stairs.

In at least one embodiment, the at least one structural element includes at least one of a door, a window, a floor, and a roof, and wherein the method comprises estimating the first floor elevation or height based a presence of and a location of the at least one structural element in the image.

In at least one embodiment, the method includes comprising causing an interface screen to be displayed on a client device coupled to the at least one computer via a communication network, the interface screen comprising at least one form element for a user to upload the at least one image from the client device to the at least one computer.

In at least one embodiment, the method includes causing an interface screen to be displayed on a client device coupled to the at least one computer via a communication network, the interface screen includes at least one form element for a user to provide at least one address for the structure on the real property; and retrieving the at least one image that depicts the structure on real property from a service provider database.

In at least one embodiment, the address includes an image address for retrieving the at least one image from a local or remote repository.

In at least one embodiment, the address includes a property address and wherein the at least one computer retrieves the at least one image based on the property address.

In at least one embodiment, the method includes storing meta data associated with the at least one image, the meta data comprising at least one of: time/date stamp, image resolution, camera orientation, camera gyroscope position/rotation, accelerometer information, and zoom level at a time of image capture.

In at least one embodiment, the method includes processing the at least one image based on the meta data associated with the at least one image.

In at least one embodiment, the method includes receiving a batch of images; processing each of the images in the batch of images; and for each of the images estimating a first floor elevation or height of a structure on the real property therein based on the structural element of interest. In at least one embodiment, the method includes preprocessing the at least one image for compliance with at least one criterion for reliable object detection.

In at least one embodiment, the at least one criterion includes image resolution and wherein preprocessing the at least one image comprises rescaling the at least one image while retaining aspect ratio.

In at least one embodiment, predicting that the bounding box contains a structural element of interest comprises analyzing the at least one image using a machine learning based model trained to identify structural elements in the at least one image.

In at least one embodiment, the machine learning based model is trained to identify stairs in a set of stairs.

In at least one embodiment, the machine learning based model is further trained to identify at least one of doors, windows, ground/grade, sill plate, and roof in the at least one image.

In at least one embodiment, the at least one image is presented to an object detection neural network.

In at least one embodiment, the method includes estimating a first floor elevation or height of property structures in each of a plurality of images and causing an interface screen to be displayed that includes a mapping of the first floor elevation or heights.

In at least one embodiment, the interface screen further includes an indication of a number of properties at risk of flooding.

In another aspect, a computer system is provided that includes at least one computer having software stored thereon that when executed causes the at least one computed to perform a method comprising: causing an interface screen to be displayed on a client device coupled to the at least one computer via a communication network, the interface screen comprising at least one form element for a user to identify the at least one image to be uploaded to the at least one computer; receiving at least one image that depicts a structure on real property, the structure having a first floor and at least one structural element in the at least one image, wherein the at least one structural element comprises a set of stairs; dividing the image into a plurality of regions; predicting at least one bounding box for the at least one structural element in the at least one image; predicting that the bounding box contains a structural element of interest, wherein predicting comprises analyzing the at least one image using a machine learning based model trained to identify a set of stairs in the at least one image, predicting a plurality of bounding boxes for each stair of the set of stairs, and counting a number of stairs in the set of stairs; estimating a first floor elevation or height of the structure on the real property based on the number of stairs in the set of stairs; storing the estimated first floor elevation or height in at least one database; and causing an interface screen to be displayed that includes a mapping of the first floor elevation or heights for each of a plurality of properties.

BRIEF DESCRIPTION OF THE DRAWINGS

The methods and systems disclosed herein are illustrated in the figures of the accompanying drawings which are meant to be exemplary and not limiting, in which like references are intended to refer to like or corresponding parts.

DETAILED DESCRIPTION

Figure 1:
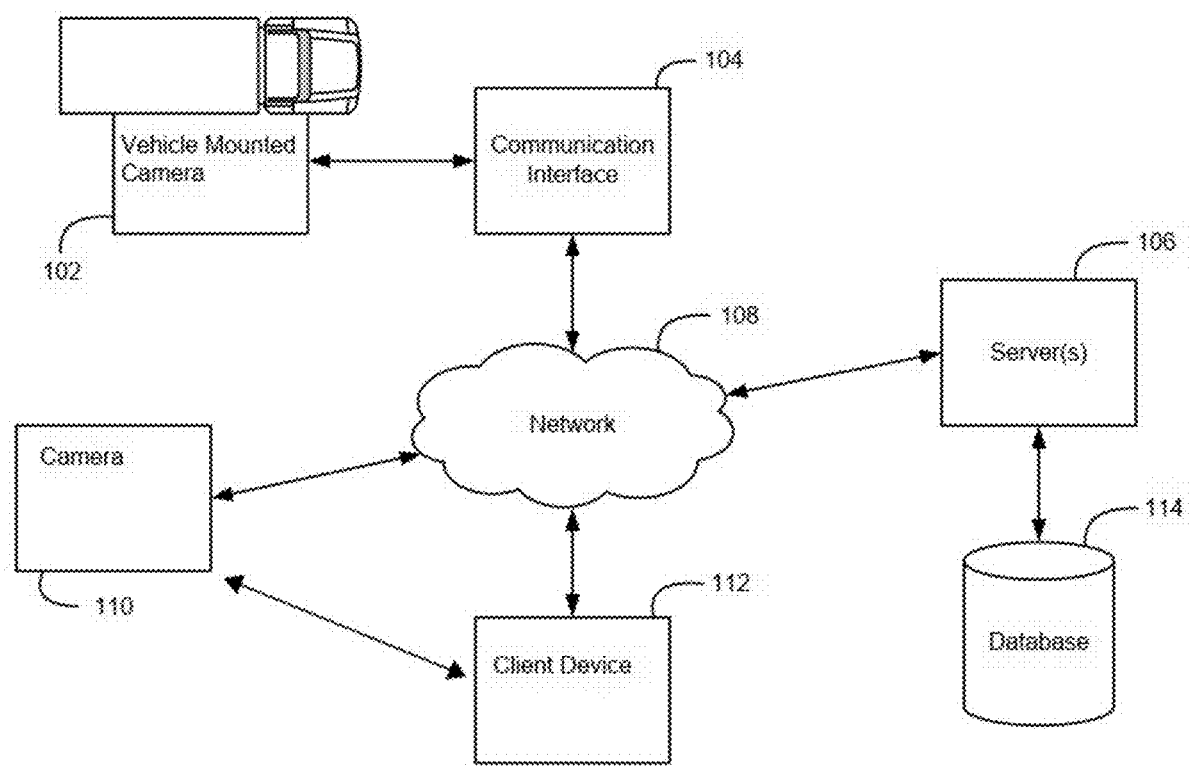
FIG. 1 illustrates a computing system for use in identifying objects in digital images according to at least one embodiment of the systems disclosed herein.

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be used and structural changes may be made without departing from the scope of the present invention. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware, or any combination thereof. The following detailed description is, therefore, not intended to be taken in a limiting sense.

The present application generally provides computer systems and computer-implemented methods performed by such systems, designed to assess the elevation of certain features of objects in a digital image, such as structures on real property (e.g., house, barn, industrial facility, etc.). Preferably, the systems assess the elevation of the structures on the real property, as discussed in greater detail below.

In at least one embodiment, the system utilizes computer readable images taken by a photo camera, and a computer program encoded when executed on a computer system to analyze such images and identify therein certain reference features. Various processes may be used to analyze photos in this regard. In at least one embodiment, the computer system/program code when executed, first, reads the image and optionally resizes the image to a desired format. The system may then detect certain reference objects in that image. With respect to real property, the system may identify elements of the structure in the image, such as steps, stairways, windows, doors, floors, and roofs in the images.

After processing the image, the computer system/program provides information about the reference objects and particularly the structural elements therein. For example, the computer system may provide stairway, window, door, etc. counts or other information, the height and/or the elevation thereof, or the number of and/or height/elevation of any of the reference objects or structural elements detected in the image. The computer system may also determine and therefore provide relationships of objects in the image relative to each other, such as the number of steps within a stairway or the number of windows within a floor, e.g., basement, first floor, etc. This information may further be processed to combine step count and step height, and provide an estimate based thereon about the 'height of the first floor above the ground' also called 'first floor elevation', 'ground floor elevation', or 'structural elevation' of the structure. Beneficially, this workflow allows for the quick and efficient automated gathering of data from digital images. This system derived information may be used in various ways, as discussed further below.

FIG. 1 illustrates an exemplary computing system configured to provide the functionality disclosed herein. The system presented in FIG. 1 may include a vehicle mounted camera system 102, a communication interface 104, one or more server(s) 106 coupled to one or more databases 114, a communication network 108, a camera device 110, and/or a client device 112, or any combination thereof. The vehicle mounted camera 102 may include image capturing hardware for capturing digital images while the vehicle is stationary and/or preferably while the vehicle is in motion.

The camera system 102 may store a collection of the images taken for a given time locally for upload to the server(s) 106 later or the camera system 102 be configured with or connected to a communication interface 104 for transferring the images over the communication network 108 to the one or more servers 106 periodically and/or in real-time, automatically or otherwise. The images may ultimately be stored in one or more image databases 114, along with other data with respect to the subject properties, such as the street address and/or geolocation data (latitude, longitude, elevation), as well as meta data obtained by or via the camera 102, such as time/date stamps, image resolutions, camera orientation (e.g., relative to north), camera gyroscope position/rotation, accelerometer information, etc. If the images include text, the system may optically recognize the text and store the textual information in the one or more databases in association with the images and/or the image metadata. For example, if the image includes a home with a street number and/or name, the system may recognize this text and store it for use, for example, in confirming the address of the property, along with other meta data. The communication interface 104 may include hardware and software including networking components, control systems, sensors, positioning systems, and wired/wireless connections that allow server(s) 106 to communicate with the camera system 102 in a variety of autonomous, semi-autonomous, or manual mode to capture and store a collection of images for use to provide the functionality disclosed herein.

Server(s) 106, as described herein, may vary widely in configuration or capabilities, but are preferably special-purpose digital computing devices that include at least one or more central processing units and computer memory. The server(s) 106 may also include one or more of mass storage devices, power supplies, wired or wireless network interfaces, input/output interfaces, and operating systems, such as Windows Server, Mac OS X, Unix, Linux, FreeBSD, or the like. In an example embodiment, server(s) 106 may include or have access to memory for storing instructions or applications for the performance of various functions and a corresponding processor for executing the stored instructions or applications. For example, the memory may store an instance of the server(s) 106 configured to operate in accordance with the embodiments disclosed herein.

According to another embodiment, server(s) 106 may include cloud computing data centers configured to provide client devices 112 with access to an application, service, or platform. For example, Software-as-a Service ("SaaS") provides the capability to use a provider's applications running on a cloud infrastructure. The applications in these instances may be accessible from various client devices 112 through a thin client interface, such as a web browser or an application or app. Cloud computing includes a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Server(s) 106 may connect to the camera system 102, the camera 110, and/or the client device 112 directly or through communication interface 104, as shown. The server(s) 106 generally store the images captured, or otherwise supplied or uploaded thereto from one or more of the system components, including the camera system 102, camera 110, and/or client device 112. The server(s) may provide a platform that includes a web interface that can be accessed over network 108 view images and obtain information therefrom with respect to, inter alia, the structural elevation of property. The servers 106 may be operated by one or more service providers. For instance, a first service provider may operate one or more servers and provide access to a repository of digital images and related information for use by the system 100. For example, the system 100 may use image and related information using Google® Maps APIs to access, inter alia, street views of properties and associated location and elevation data. A second service provider may operate one or more servers that similarly stores photos and property information, and that further execute software code that provides the functionality discussed herein, including providing access and functionality via the thin client, as discussed above, analyzing photos, and determining therefrom, e.g., first floor elevation, or other quantifiable data, such as stairway, window, door, etc. counts, the height and/or the elevation thereof, or the number of and/or height/elevation of any of the reference objects or structural elements detected in the image.

Communication network 108 may be any suitable type of network allowing transport of data communications across thereof. The network 108 may couple devices so that communications may be exchanged, such as between servers and client devices or other types of devices, including between wireless devices coupled via a wireless network, for example. A network may also include mass storage, such as network attached storage (NAS), a storage area network (SAN), cloud computing and storage, or other forms of computer or machine-readable media, for example. In one embodiment, the network may be the Internet, following known Internet protocols for data communication, or any other communication network, e.g., any local area network (LAN) or wide area network (WAN) connection, cellular network, wire-line type connections, wireless type connections, or any combination thereof. Communications and content stored and/or transmitted to and from devices may be encrypted using, for example, the Advanced Encryption Standard (AES) with a 128, 192, or 256-bit key size, or any other encryption standard known in the art.

Camera device 110 and/or client device 112 may include computing devices (e.g., desktop computers, laptops, personal digital assistants (PDA), cellular phones, smartphones, tablet computers, or any computing device having a central processing unit and memory unit capable of connecting to a network). The camera 110/client device 112 may include computing devices and vary in terms of capabilities or features, for example, a cell/smart phone, a tablet computer, a laptop, and in-dash car computer, or the like. The client device 112 may include a web-enabled client device, which may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display.

Figure 2:
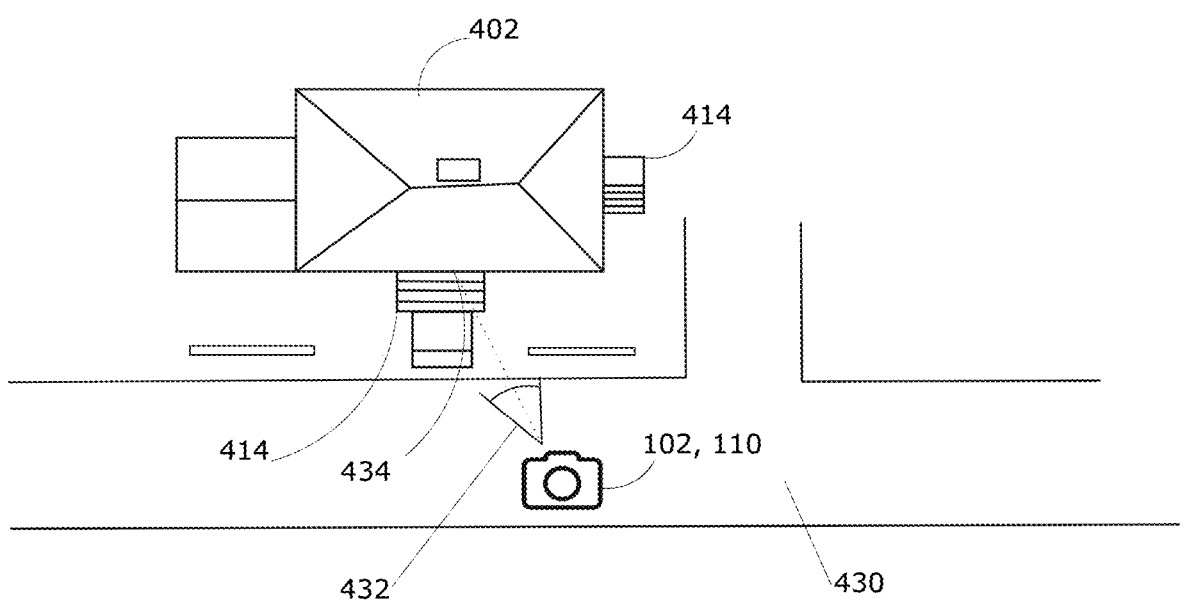
FIG. 2 illustrates a plan view of a reference property for use in identifying objects relative thereto according to at least one embodiment of the methods and systems disclosed herein.

FIG. 2 depicts a plan view of a reference property. The property includes a house 400 or other structure with one or more sets of stairs or stairways 414. The house 402 is located on a plot off from the street 430. A photo of the house 400 may be taken or may have been taken with camera 102, 110. The camera 102, 110 has a field of view 432 relative to a fixation point 434. When the camera 102, 110 is located off center relative to the house 400, the resulting image is a perspective view which may include optical distortions.

Figure 4A:
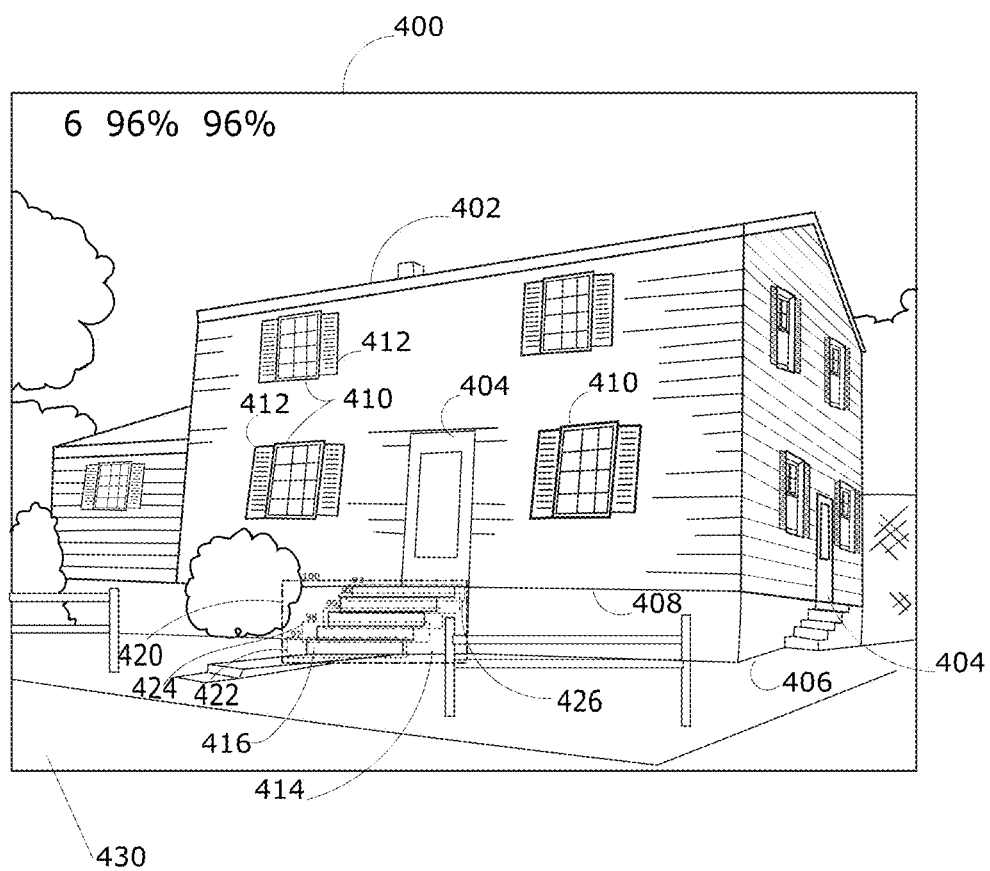
FIG. 4A-4B illustrate a digital image with objects identified therein by the system according to at least one embodiment of the methods and systems disclosed herein.

FIG. 4A depicts an exemplary photo 400 of a house 402. The house 402 includes a pair of doors 404 and a plurality of windows 410 with shutters 412. The sill plate 408 of the house 402 is a certain elevation above ground level 406. The foundation wall and thus the sill plate 408 may be concealed with bushes, as shown, or may not be easily discernible in the photo. The house 402 includes stairways 414, which include a plurality of stairs 416. Importantly, the stairways 414 extend outward from the house 402 unobstructed and are therefore more easily perceived in the photo. The doors 404 and windows 410 are similarly unobstructed. Accordingly, the system 100 preferably processes images to identify therefrom such unobstructed structure of house 402 that may then be translated into the first-floor elevation (FFE) or first-floor height (FFH), or other desired dimension for the house 402.

Figure 3:
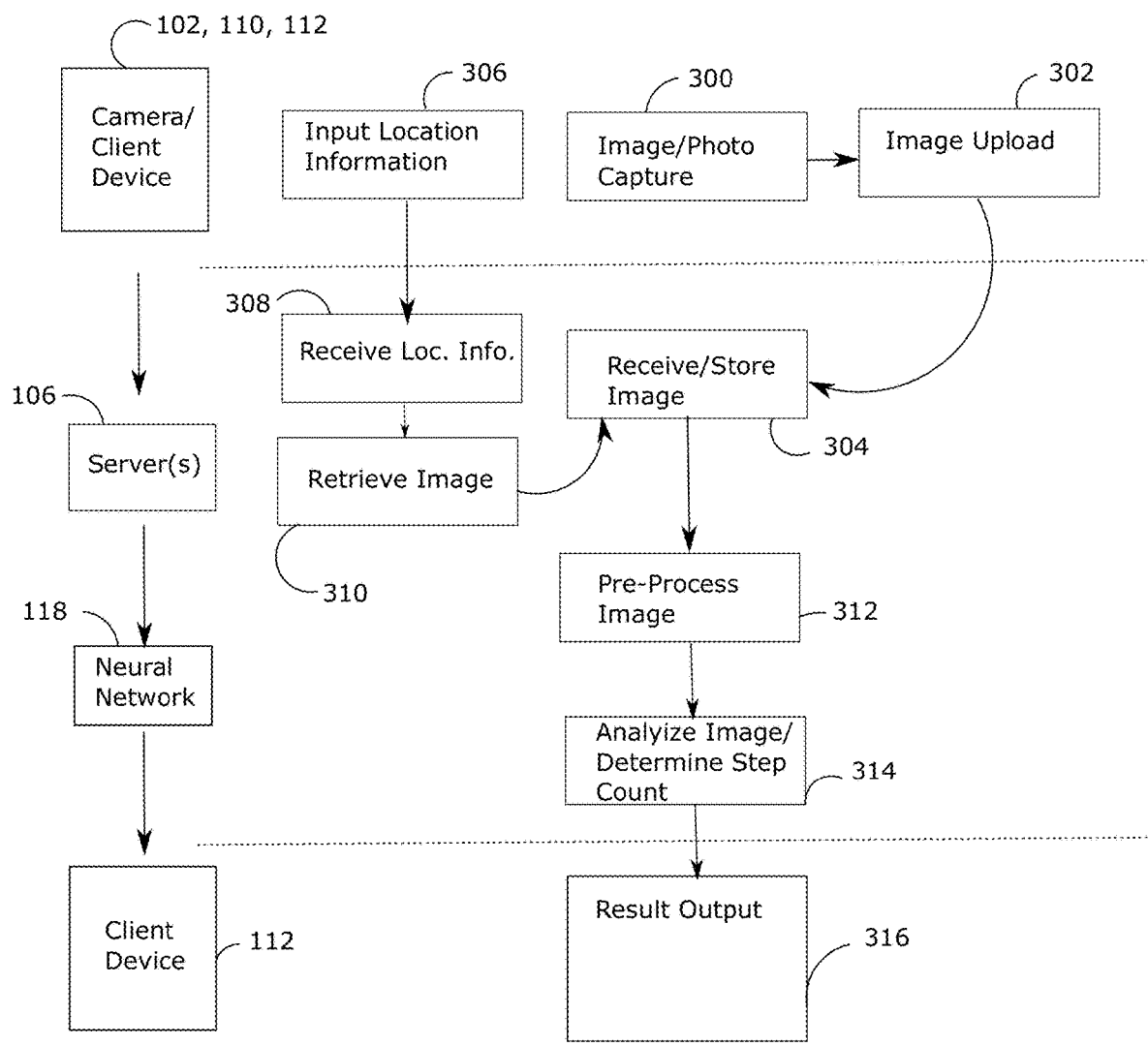
FIG. 3 illustrates a data flow diagram for identifying objects in digital images according to at least one embodiment of the methods disclosed herein.

With reference to FIG. 3, the process for identifying objects in a photo/image according to at least one embodiment begins with a user taking a picture or otherwise capturing an image 300, for example, with a photo camera 102, 110 or any other similarly capable client device 112, vehicle mounted or otherwise. The photo may be stored locally on the device 102, 110, 112 and/or uploaded 302 directly or indirectly to a server 106, where the image is received and stored 304 in one or more databases along with related data, as discussed herein. The database may be private, or a public repository of photos that include images of real property and structures thereon, as discussed above. The photo may be one that has been taken previously, stored with a service provider for a limited amount of time for processing, and/or retrieved from a public database with more persistent images for processing in accordance with the present disclosure. In this regard, the images may be removed from the service provider database once processed. In one embodiment, the photo needs to be available as a digital image to be processed and analyzed. In this regard, photos can be taken with digital cameras and then transferred to a computer/server 106, for example, with a smartphone or digital camera. Alternatively, photos may be used from third party providers, such as Google, Bing or from real estate agent websites. With respect to the later, the user may specify image location information 306, e.g., an image URL or other address, which is received 308 by the server 106. Alternatively, physical location information may be provided, such as a property address, block & lot number, geolocation information, etc. The server 106 may then use the image and/or property location information to retrieve an image of property at the given location 310, for example from the third-party provider using the third-party API.

The images should have a minimum acceptable resolution, for example, of at least 500×500 dpi. This minimum allows for easier detection of an object, such as a step, within the image of at least 10 pixels in one dimension. This means that a step seen in an image needs at least 10 pixels high to be identified by the system. In this regard, the server(s) 106 may test the image for compliance with the desired standards.

In at least one embodiment, the available image or images are sent via an API to a remote server in the cloud, together with an API key, where the image(s) will preferably first be pre-processed 312. The pre-processing may include a rescaling to the recommended image resolution, e.g., of at least 500×500 dpi. Therefore, if the image is 250×500 in height and width, respectively, the image size gets changed by a factor of 2 to be 500×1,000 dpi so that the minimum dimension is met, while also retaining the aspect ratio. After pre-processing, the image can be analyzed 314 via a machine learning based model, which has been trained to identify particular objects in the image. More specifically, the algorithm may be trained to identify stairways, steps, doors, windows, the ground/grade, sill plate, etc. The algorithm may also identify associations with the objects, such as first or second floor windows, etc.

In at least one embodiment, the following parameters are collected from the image: 1) image dimensions, e.g., image width and image height, 2) distance between the location where the image was taken, i.e., the camera, and the structure in the image, e.g. the house, that is supposed to be analyzed, and/or 3) the zoom level of the image, which is called Focus of View for Google images, that defines the resolution of an image. With referenced to the distance information, when Google Street View static images are used as a basis for the analysis, the distance can be calculated between the camera and the defined house location, i.e., geolocation of the camera and the geolocation of the address or corner points of the house. If non-commercial images are being used, the geolocation of the photo may be matched to addresses or other property data using commercial databases, including without limitation Google static image data.

In at least one embodiment, images are processed based on location data using shell scripts independent of the computer's operation system. Here, a software script may be executed in the computer command-line shell as an alternative way to estimate first floor heights as discussed herein. In this regard, the location data or address may be read by the script and images from Google Street View can be downloaded and processed locally, remotely by one or more servers, or a combination thereof. Where existing images are being processed, these can be processed as discussed herein locally with a call shell script.

In a preferred embodiment, images of a property may be presented to a real-time object detection neural network, such as a "You only look once" (YOLO) neural network. The neural network is preferably configured to receive the full image and 1) divides the image into regions, 2) predicts bounding boxes, and 3) predicts for each region probabilities with respect to the bounding boxes containing objects of interest, such as sets of steps or stairs/stairways, doors, windows, roofs, etc., or any other geometric shape, e.g., square, rectangle, circle, etc. The neural network preferably weights the determined bounding boxes by the predicted probabilities, as shown in FIGS. 4A and 4B.

This type of neural network has several advantages over classifier-based systems because it looks at the entire image at test time, so its predictions are informed by global context in the image. The neural network also preferably makes predictions with a single network evaluation. Alternative systems may be used, such as Recurrent Convolutional Neural Networks (R-CNN), but alternative systems may require many evaluations for a single image which would limit the real-time capabilities of the system. This specific characteristic of the preferred neural network make the system extremely fast, as much as 1000× faster than an R-CNN and 100× faster than Fast R-CNN type of network, making the system particularly capably of real-time processing, for example, while the vehicle camera embodiment is in motion.

Figure 4B:
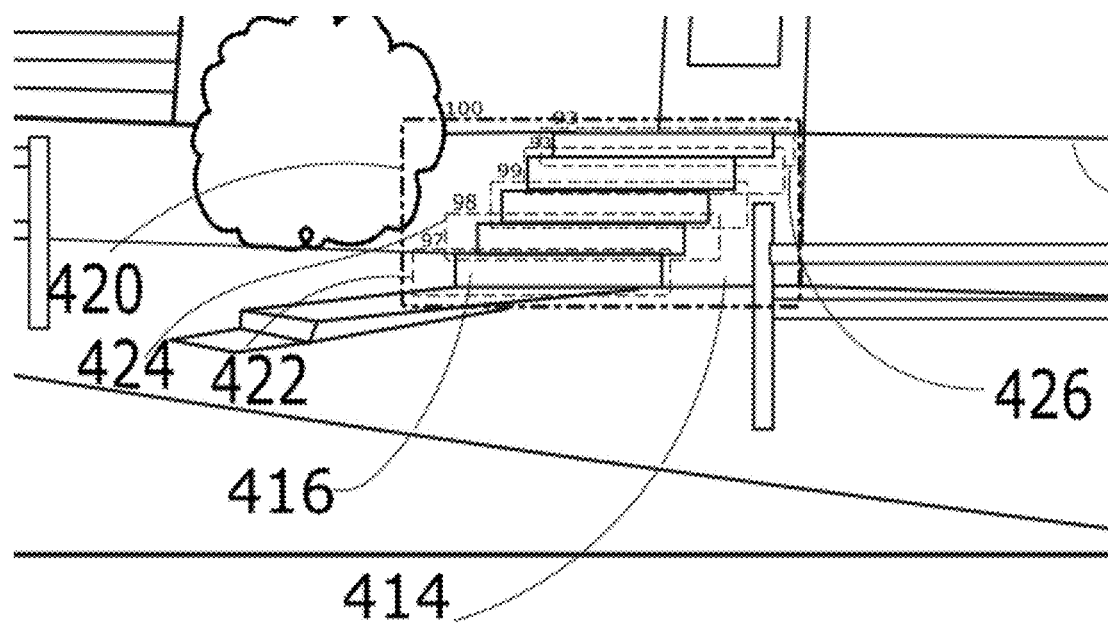

Referring to FIG. 4B, the neural network preferably detects objects in the image, such as steps and sets of steps or stairways directly. In this instance, the network produces the bounding boxes for detected objects within an image as shown. For example, the network may produce a first bounding box 420 around stairs 414 and may further provide the certainty (100%) as shown. The network may further produce bounding boxes 422, 424, . . . , 426 for each of the steps 416, along with the certainty associated therewith (97, 98, 99, . . . , 93). The identified bounding boxes around the objects (steps) may then be counted for each image presented to the network. If the network gets 3 images presented to it, it will return 3 step count results for the given property or properties to the server(s) 106. The step count results may then be used by a classification model to estimate the final step count of the analyzed property. If a property is very large, such as for instance a school or an industrial facility, several images can be analyzed for each corner point of the building. In this case, the final outcome will be several step counts per building or per building complex. The step counts may then be stored by the server(s) 106 in the one or more databases in association with the respective property or properties. The network may further detect the presence of a basement, number of floors, roof pitch, etc., which are similarly stored by the server(s) 106 in one or more databases.

The step counts or counts of any other geometric shape in the image may be used in a variety of ways. In one embodiment, a direct step counting method includes identifying and counting steps and stairways in digital images to estimate the height of the first floor of a residential or commercial building above ground level, utilizing machine learning based object detection algorithms as discussed herein. In another embodiment, an indirect step counting method includes collecting structural elements in digital images to estimate the height of the first floor of a residential or commercial building above ground level by utilizing machine learning based object detection algorithms. These heights may be stored in a database in association with other property information, including without limitation, address, ground elevation, geolocation data, survey data, images, etc. The heights and any of the information derived therefrom may also be mapped out in a manner similar to a topographic or heat map, showing clusters of properties with similar heights. In either event, the step count or other measures of the property (e.g., first floor elevation or height) may be output 316 to the client device 112.

The resulting estimates of the first-floor elevation (FFE) or height (FFH) may be used to assess the risk due to flooding at the given property. Therefore, single property estimates or average estimates for communities or postal codes may be used for risk mitigation measures, such as lifting and raising of houses or risk transfer based on insurance. The spatial information may be used also for portfolio steering in insurance and financial industry, such as mortgage-backed securities.

In one embodiment, once the FFH of a property is estimated, the FFH can be used to determine the elevation of the first floor of the property above expected flood levels. The expected flood levels can be derived from both a) flood models and/or b) historic observations (i.e., flood inundation data). The combination of the FFH and the flood level, referred to herein as Base Flood Elevation (BFE), can be important to determine the flood risk that a property is exposed to. Historically the BFE is used and the FFH is measured through expensive Elevation Certificates (EC) by land surveys. With the technology disclosed herein, the FFH can be measured in a much faster and cost-efficient way.

By knowing the elevation of a property's first floor above the expected flood levels, a property owner (user of the technology) can get a better understanding of whether and to what extent the property is at risk to get flooded, in particular, in light of a changing climate with an ongoing and accelerating sea level rise or with more precipitation resulting in flash and river floods as well as storm surges along the coast. As discussed herein, the system may generally predict structural elements and count such elements in a photo or photos. In this regard, the counts produced by the system may be used in various other ways. For example, the system may be used as an estimating tool to determine the costs of repair or replacement of the elements shown in the photo. The system may also be used as an inventory tracking tool, in which the system generally identifies and counts common geometric shapes in a photo, such as the number of blocks in a photo depicting a pallet containing concrete blocks or any other product that may similarly be identified and counted.

Figure 5:
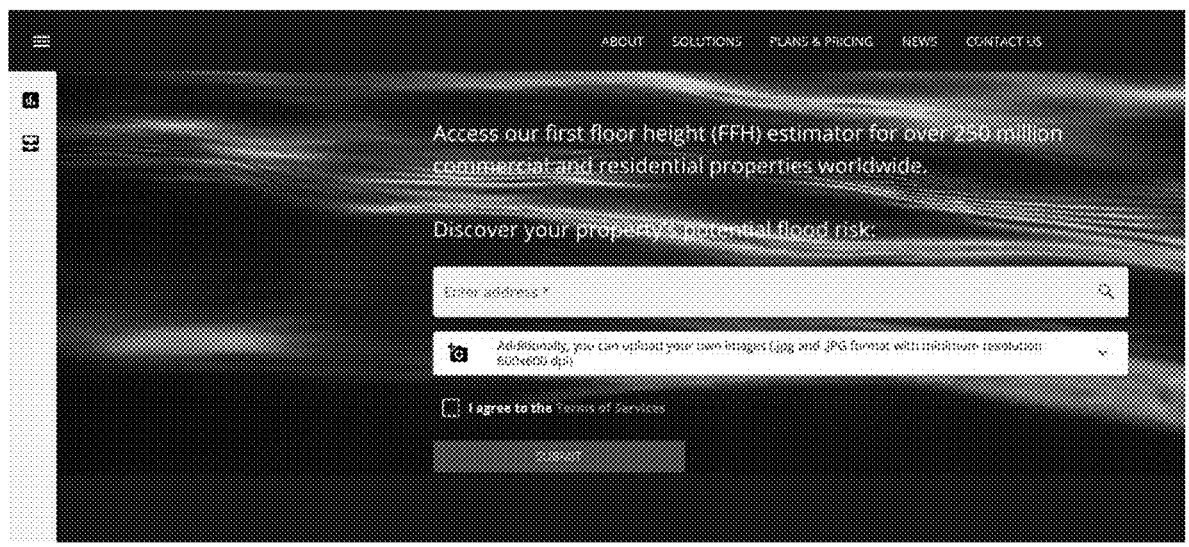
FIGS. 5-7 illustrate interface screens generated according to at least one embodiment of the methods and systems disclosed herein.

The system 100 preferably provides an online platform or connected App for users to access the functionality disclosed herein. Referring to FIG. 5, the system 100 may provide or otherwise cause to be displayed at a client device an interface screen which includes therein form elements for the user to specify an address of the property/image and/or upload one or more images for analysis. The first-time user registers and may be provided limited access, such as three lookups total or for a given period of time. After logging in, the user can enter an address and/or upload images, and as a result the user can be presented with an interface screen that includes a risk report for the given property, which report preferably includes the information discussed herein.

Figure 6:
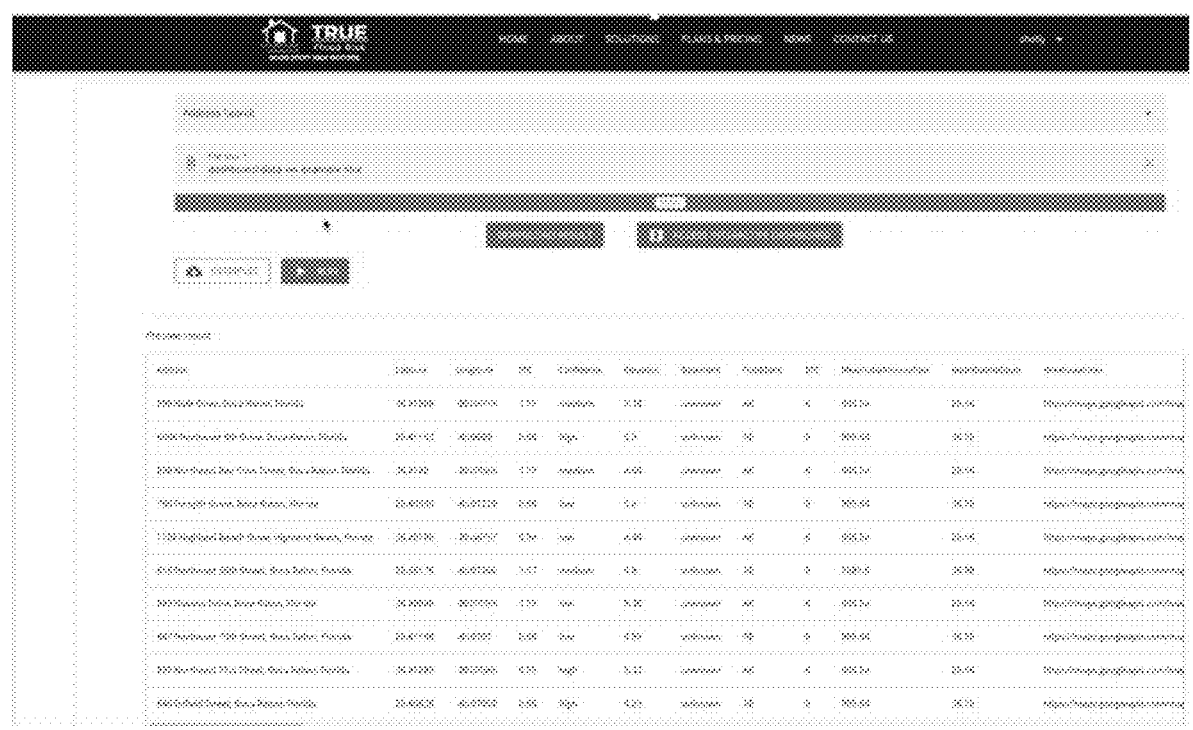

Alternatively or additionally, direct user access may further be provided with an API, which may return results using API calls that specify, for example, address, geocoordinates, or files or addresses/directories containing one or more images, spreadsheets, etc. with the information for the API to return risk reports for one or a batch of properties. A sample batch report is shown in FIG. 6. As shown in the report, the system may provide a list of results which include property information (address, geocoordinates), FFE, confidence, elevation, the presence of a basement, flood zone, BFE, mean total claims paid, mean claim counts, and links to street views.

Figure 7:
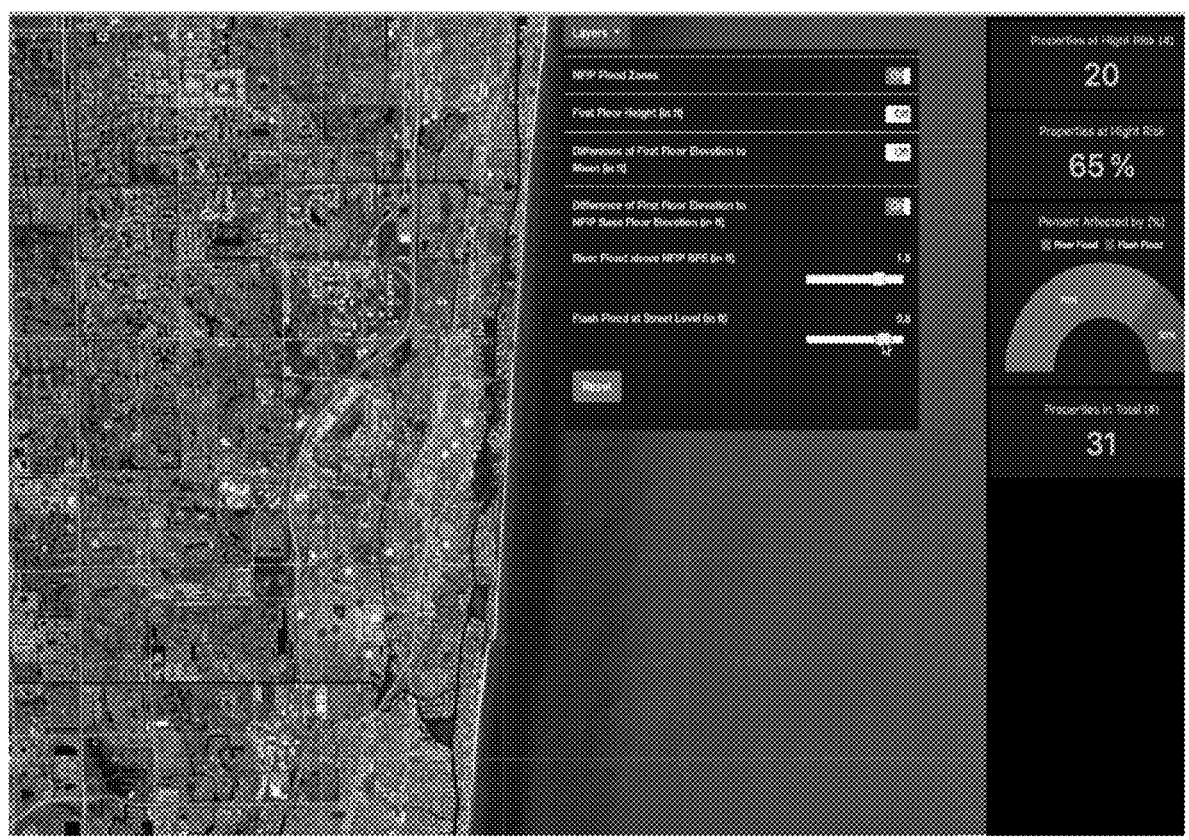

In one embodiment, the system 100 provides an interface screen with a map view with relevant layers superimposed on the map. Referring to FIG. 7, the map view may provide a form element for the user to view NFIP flood zones and to specify filter criteria based on FFE, BFE, etc. The map view may further provide the number of properties at risk, the percentage classified as high risk, as well as percentage affected by river and/or flash flooding within the map view. As can be seen, the properties with low risk may be shown in as greed dots, medium risk as yellow dots, and high risk as red dots. The size of the dots may vary according to the risk. Preferably, zooming in or out of the map view causes the interface screen to refresh the data therein.

The various views illuminate the change of the flood risk given certain flood heights. Finally, the amount and the total asset amount of properties at risk can be shown which can be used for portfolio steering of insurance companies or for better understanding how much mortgage backed securities that are held by a financial institution are at risk. Other uses include flood insurance costing, portfolio steering of existing insurance policies or mortgage backed securities, identifying homeowners with houses at risk aiming at elevating the houses to make them more resilient against future floods in part due to a changing climate, prospecting new potential customers for marketing purposes, etc.

Flood risk is often seen as a horizontal problem. That is, a property, house, or building flood risk may be classified based on whether the given property falls within a flood zone. Moreover, the expected flood damage and thus flood insurance premiums are then determined based on the applicable flood zone that the property is in. However, the process outlined herein allows users to visualize flood risk as a vertical problem. That is, the probability that flood water covers the ground and rises until it reaches the first floor of the building where it causes damage. Therefore, knowing the first-floor height is more important to estimate potential flood damage and flood insurance premiums.

Estimated first flood height values can be used at the beginning of the underwriting process, making the underwriting process faster and more importantly more accurate. Using the systems disclosed herein, a property owner who wants to get a flood insurance cover for its home or a wholesale or retail insurance agent/broker can issue flood insurance policies very efficiently without going through a lengthy process of land surveying or field inspections.

FIGS. 1 through 7 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine-readable medium as part of a computer program product and is loaded into a computer system or other device or machine via a removable storage drive, hard drive, or communications interface. Computer programs (also called computer control logic or computer-readable program code) are stored in a main and/or secondary memory, and executed by one or more processors (controllers, or the like) to cause the one or more processors to perform the functions of the invention as described herein. In this document, the terms "machine readable medium," "computer-readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A computer system comprising at least one computer configured to perform a method comprising:
   receiving at least one image that depicts a structure on real property, the structure having a first floor and at least one structural element in the at least one image, wherein the at least one structural element comprises at least one set of stairs each stair having a riser;
   testing the at least one image for compliance with at least one criterion for reliable object detection;
   dividing the image into a plurality of regions;
   predicting a first bounding box for the at least one set of stairs in the at least one image;
   predicting a plurality of other bounding boxes, the plurality of other bounding boxes comprising a bounding box for each of a plurality of risers of the at least one set of stairs;
   counting a number of stairs in the at least one set of stairs based on the predicted plurality of other bounding boxes, wherein counting the number of stairs comprises counting a number of bounding boxes for the plurality of risers of the at least one set of stairs;
   estimating a first-floor elevation or a height of the at least one set of stairs based on the number bounding boxes for the plurality of risers of the at least one set of stairs; and
   storing the estimated first-floor elevation or height of the at least one set of stairs in at least one database.

2. The computer system of claim 1, wherein the at least one structural element further comprises at least one of: a door, a window, a floor, and a roof, and wherein the method comprises estimating the first floor elevation or height based on a presence of and a location of the at least one structural element in the image.

3. The computer system of claim 1, the method comprising causing an interface screen to be displayed on a client device coupled to the at least one computer via a communication network, the interface screen comprising at least one form element for a user to identify and upload the at least one image from the client device to the at least one computer.

4. The computer system of claim 1, the method comprising: causing to be displayed an interface screen on a client device coupled to the at least one computer via a communication network, the interface screen comprising at least one form element for a user to provide at least one address for the structure on the real property; and retrieving the at least one image that depicts the structure on real property from a service provider database.

5. The computer system of claim 4, wherein the address comprises an image address for retrieving the at least one image from a local or remote repository.

6. The computer system of claim 4, wherein the address comprises a property address and wherein the at least one computer retrieves the at least one image based on the property address.

7. The computer system of claim 1, the method comprising storing meta data associated with the at least one image, the meta data comprising at least one of: time/date stamp, image resolution, camera orientation, camera gyroscope position/rotation, accelerometer information, and zoom level at a time of image capture.

8. The computer system of claim 7, the method comprising processing the at least one image based on the meta data associated with the at least one image.

9. The computer system of claim 1, the method comprising: receiving a batch of images; processing each of the images in the batch of images; and for each of the images estimating a first floor elevation or height of a structure on the real property therein based on the structural element.

10. The computer system of claim 1, wherein the at least one criterion comprises image resolution, the method further comprising preprocessing the at least one image which comprises resealing the at least one image while retaining aspect ratio.

11. The computer system of claim 1, wherein predicting that the first or the plurality of other bounding boxes contains a structural element comprises analyzing the at least one image using a machine learning based model trained to identify structural elements in the at least one image.

12. The computer system of claim 11, wherein the machine learning based model is trained to identify stairs in a set of stairs.

13. The computer system of claim 12, wherein the machine learning based model is further trained to identify at least one of doors, windows, ground/grade, sill plate, and roof in the at least one image.

14. The computer system of claim 11, wherein the at least one image is presented to an object detection neural network.

15. The computer system of claim 1, comprising estimating a first floor elevation or height of property structures in each of a plurality of images and causing an interface screen to be displayed that includes a mapping of the first floor elevations or heights.

16. The computer system of claim 15, wherein the interface screen further includes an indication of a number of properties at risk of flooding.

17. A computer system comprising at least one computer having software stored thereon that when executed causes the at least one computer to perform a method comprising:
   causing an interface screen to be displayed on a client device coupled to the at least one computer via a communication network, the interface screen comprising at least one form element for a user to identify the at least one image to be uploaded to the at least one computer;
   receiving at least one image that depicts a structure on real property, the structure having a first floor and at least one structural element in the at least one image, wherein the at least one structural element comprises a set of stairs;
   testing the at least one image for compliance with at least one criterion for reliable object detection;
   dividing the image into a plurality of regions;
   predicting at least a first bounding box for the at least one structural element in the at least one image;
   analyzing the at least one image using a machine learning based model trained to identify a set of stairs in the at least one image;
   predicting therefrom a plurality of other bounding boxes, the plurality of other bounding boxes comprising a bounding box for each of a plurality of risers of the set of stairs;
   counting a number of stairs in the at least one set of stairs based on the predicted plurality of other bounding boxes, wherein counting the number of stairs comprises counting a number of bounding boxes for the plurality of risers of the at least one set of stairs;
   estimating a first-floor elevation or a height of the at least one set of stairs based on the number bounding boxes for the plurality of risers of the at least one set of stairs;
   storing the estimated first floor elevation or height in at least one database; and
   causing an interface screen to be displayed that includes a mapping of the first floor elevations or heights for each of a plurality of properties.

18. The computer system of claim 17, wherein the interface screen further includes an indication of a number of properties at risk of flooding.

* * * * *

UNITED STATES PATENT AND TRADEMARK OFFICE
CERTIFICATE OF CORRECTION

| | | |
|---|---|---|
| PATENT NO. | : 11,120,557 B1 | |
| APPLICATION NO. | : 17/173157 | |
| DATED | : September 14, 2021 | |
| INVENTOR(S) | : Shelly Klose and Christian Klose | |

It is certified that error appears in the above-identified patent and that said Letters Patent is hereby corrected as shown below:

On the Title Page

Under item (12) "Klose" should read --Klose et al.--

Inventors item (72) Line 2, please add --Christian Klose, Bronxville, NY (US)--

Signed and Sealed this
Fourteenth Day of February, 2023

*Katherine Kelly Vidal*

Katherine Kelly Vidal
*Director of the United States Patent and Trademark Office*